United States Patent
Uno

(10) Patent No.: US 11,662,221 B2
(45) Date of Patent: May 30, 2023

(54) CHANGE POINT DETECTION DEVICE AND MAP INFORMATION DISTRIBUTION SYSTEM

(71) Applicant: TOYOTA JIDOSHA KABUSHIKI KAISHA, Toyota (JP)

(72) Inventor: Satoshi Uno, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 17/154,172

(22) Filed: Jan. 21, 2021

(65) Prior Publication Data
US 2021/0231460 A1   Jul. 29, 2021

(30) Foreign Application Priority Data
Jan. 23, 2020 (JP) .............................. JP2020-009322

(51) Int. Cl.
| | |
|---|---|
| *G01C 21/00* | (2006.01) |
| *G06T 7/62* | (2017.01) |
| *G06V 20/58* | (2022.01) |
| *G06V 20/56* | (2022.01) |

(52) U.S. Cl.
CPC ..... *G01C 21/3841* (2020.08); *G01C 21/3815* (2020.08); *G06T 7/62* (2017.01); *G06V 20/582* (2022.01); *G06V 20/588* (2022.01); *G06T 2207/30256* (2013.01)

(58) Field of Classification Search
CPC ............ G01C 21/3815; G01C 21/3697; G01C 21/3848; G01C 21/3673; G06T 7/74; G06V 20/56; G08G 1/096716; H04B 1/3822; G05D 1/024; G09B 29/00; B25J 9/162
See application file for complete search history.

(56) References Cited

U.S. PATENT DOCUMENTS

| | | | | |
|---|---|---|---|---|
| 2008/0243380 | A1* | 10/2008 | Han | ................... G01C 21/3697 701/431 |
| 2016/0232412 | A1* | 8/2016 | Nishijima | ............... G06V 20/56 |
| 2016/0275790 | A1* | 9/2016 | Kang | ............... G08G 1/096716 |

(Continued)

FOREIGN PATENT DOCUMENTS

| | | | | |
|---|---|---|---|---|
| CN | 103868515 A | * | 6/2014 | .......... G01C 21/367 |
| CN | 111976722 A | * | 11/2020 | ............. B60R 11/04 |

(Continued)

*Primary Examiner* — Yuri Kan
(74) *Attorney, Agent, or Firm* — Sughrue Mion, PLLC

(57) ABSTRACT

A change point detection device includes a memory 170 that stores map information representing a structure associated with a traveling condition on and around a road, an object detection unit 162 that detects a shielding object 20 hiding the structure from an image acquired by an in-vehicle camera 110 mounted on a vehicle 100 and representing an environment around the vehicle 100, a collation unit 163 that eliminates the structure hidden by the shielding object 20 in the map information, collates the image with the map information, and calculates a coincidence degree between the image and the map information, and a change point detection unit 164 that determines, when the coincidence degree is less than or equal to a predetermined threshold value, that the structure represented in the image has a change point different from the corresponding structure represented in the map information.

5 Claims, 7 Drawing Sheets

(56) References Cited

U.S. PATENT DOCUMENTS

| | | | |
|---|---|---|---|
| 2016/0277911 A1* | 9/2016 | Kang | H04B 1/3822 |
| 2018/0120852 A1* | 5/2018 | Cho | G05D 1/024 |
| 2020/0003566 A1 | 1/2020 | Hosokawa et al. | |
| 2020/0082179 A1 | 3/2020 | Sugie et al. | |
| 2020/0175754 A1 | 6/2020 | Abe et al. | |
| 2020/0355506 A1 | 11/2020 | Muto | |

FOREIGN PATENT DOCUMENTS

| | | | | |
|---|---|---|---|---|
| CN | 114454882 A | * | 5/2022 | B60W 30/18018 |
| JP | 2004198530 A | * | 7/2004 | G09B 29/00 |
| JP | 2004-245758 A | | 9/2004 | |
| JP | 2013546040 A | * | 12/2013 | G06T 7/00 |
| JP | 2016-156973 A | | 9/2016 | |
| JP | 2018-163438 A | | 10/2018 | |
| JP | 2019-3606 A | | 1/2019 | |
| JP | 2019-045892 A | | 3/2019 | |
| JP | 2019-78562 A | | 5/2019 | |
| JP | 2019-133498 A | | 8/2019 | |

* cited by examiner

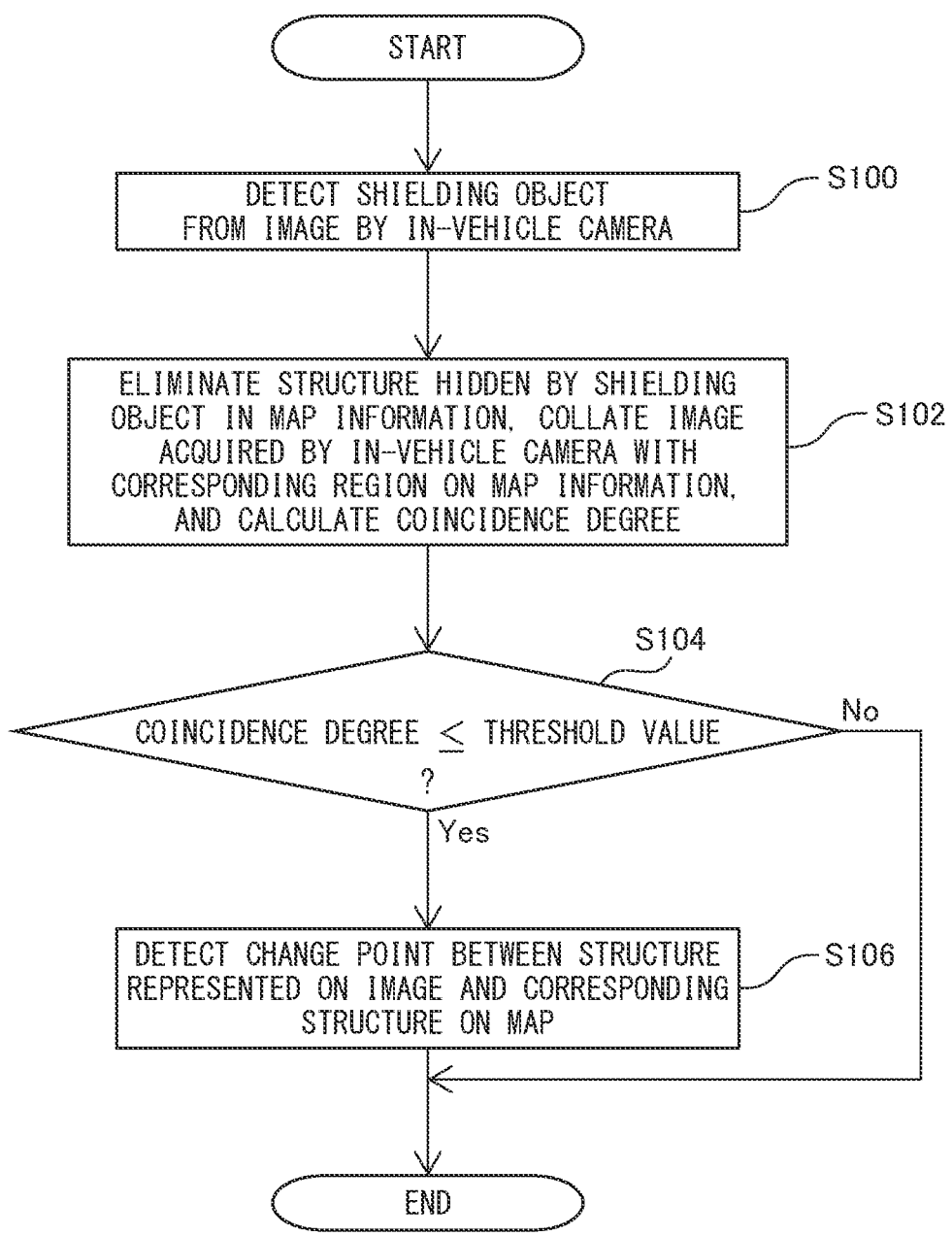

CHANGE POINT DETECTION DEVICE AND MAP INFORMATION DISTRIBUTION SYSTEM

FIELD OF THE INVENTION

The present invention relates to a change point detection device and a map information distribution system.

BACKGROUND OF THE INVENTION

In relation to a traffic information management system, as described in Japanese Unexamined Patent Publication (Kokai) No. 2004-245758, there is known a technique whereby travel information of an out-of-range route is sequentially collected into a center from a first car via a network when the first car travels on the out-of-range route and collects the travel information of the out-of-range route, traffic information of the out-of-range route where the first car has traveled is created and then managed, and the managed traffic information is transmitted to a second car via the network.

SUMMARY OF THE INVENTION

For practical use of automated driving, utilization of a high-definition map is expected. A high-definition map utilized for automated driving includes information of a traffic sign such as a lane division line, a road sign, a traffic light, and the like. A vehicle traveling by automated driving (automatedly driven vehicle) accurately estimates a position of a local vehicle, and identifies a lane where the vehicle is traveling, by matching an image around the local vehicle acquired by an in-vehicle camera mounted on the local vehicle, with a high-definition map.

However, in relation to a road or a structure around the road where an automatedly driven vehicle is traveling, when there are some sort of changes from a time of creating a high-definition map, and the image of the high-definition map and the image around the local vehicle do not match with each other, an automated driving control may have trouble.

Accordingly, the present invention is intended to identify a point where some sort of change is generated from a time of creating a high-definition map, in relation to a road or a structure therearound.

The present invention was made so as to solve the above problem and has as its gist the following.
(1) A change point detection device comprising:
a memory that stores map information representing a structure associated with a traveling condition on and around a road; and
a processor configured to:
detect, from an image that represents an environment around the vehicle acquired by a camera mounted on a vehicle, an object hiding the structure;
eliminate the structure hidden by the object in the map information, collate the image with the map information, and calculate a coincidence degree between the image and the map information; and
determine, when the coincidence degree is less than or equal to a predetermined threshold value, that the structure represented in the image has a change point different from the corresponding structure represented in the map information.
(2) The change point detection device according to above (1), wherein the processor determines whether the structure is distinguishable from the image, based on information representing a condition of an environment around the vehicle when the image is acquired, a size of a region where the object is represented on the image, or a size of the structure, and determines that the change point is present only when determining that the structure is distinguishable from the image.
(3) The change point detection device according to above (1), wherein, with regard to each of a plurality of partial images acquired by separating the image, the processor collates the partial image with a partial region corresponding to the partial images in the map information, and calculates a partial coincidence degree between the partial image and the partial region of the map information, and
when the coincidence degree is more than a predetermined threshold value, and the partial coincidence degree regarding any of the plurality of the partial images is less than or equal to a predetermined partial coincidence degree threshold value, the processor determines that the change point is present between the structure represented in the partial image and the structure represented in the partial region corresponding to the partial image in the map information.
(4) The change point detection device according to above (1), wherein the processor is further configured to update the map information, based on the change point.
(5) A map information distribution system comprising a plurality of vehicles, and a server communicable with each of the plurality of vehicles, wherein
each of a plurality of the vehicles includes a change point detection device,
the change point detection device including
a memory that stores map information representing a structure associated with a traveling condition on and around a road; and
a processor configured to:
detect, from an image acquired by a camera mounted on the vehicle and representing an environment around the vehicle, an object hiding the structure,
eliminate the structure hidden by the object in the map information, collate the image with the map information, and calculate a coincidence degree between the image and the map information,
determine, when the coincidence degree is less than or equal to a predetermined threshold value, that the structure represented in the image has a change point different from the corresponding structure represented in the map information, and
transmit information about the change point to the server when determines that the change point is present,
wherein, receiving information about the change point from any of a plurality of the vehicles, the server transmits information about the change point to another vehicle.

A change point detection device according to the present invention has an advantageous effect of being able to identify a point where some sort of change is generated from a time of creating a high-definition map, in relation to a road or a structure therearound.

BRIEF DESCRIPTION OF DRAWINGS

FIG. 8 is a flowchart illustrating the change point detection processing that is performed by a processor of an ECU.

DESCRIPTION OF EMBODIMENTS

Hereinafter, a change point detection device is described with reference to the drawings. The change point detection device collates map information and an image which represents an environment around a vehicle acquired by an in-vehicle camera, and detects a change point between a structure associated with a traveling condition represented in map information and an actual structure.

By the way, when an image is collated with map information, the image may contain an object (hereinafter, also referred to as a shielding object) hiding a structure. In this case, as a result of collating the image with the map information, there is a possibility that a change point is erroneously detected. In the present embodiment, when a shielding object is detected in an image, an image is collated with map information after a structure hidden by the shielding object is eliminated from a collation target in the map information. Due to performing of such processing, an image is collated with map information with regard to a structure that is not hidden by a shielding object, and therefore, a change point is correctly detected with regard to the structures. Moreover, no change point is detected with regard to a structure that is hidden by a shielding object, and therefore, erroneous detection of a change point is constrained.

Figure 1:
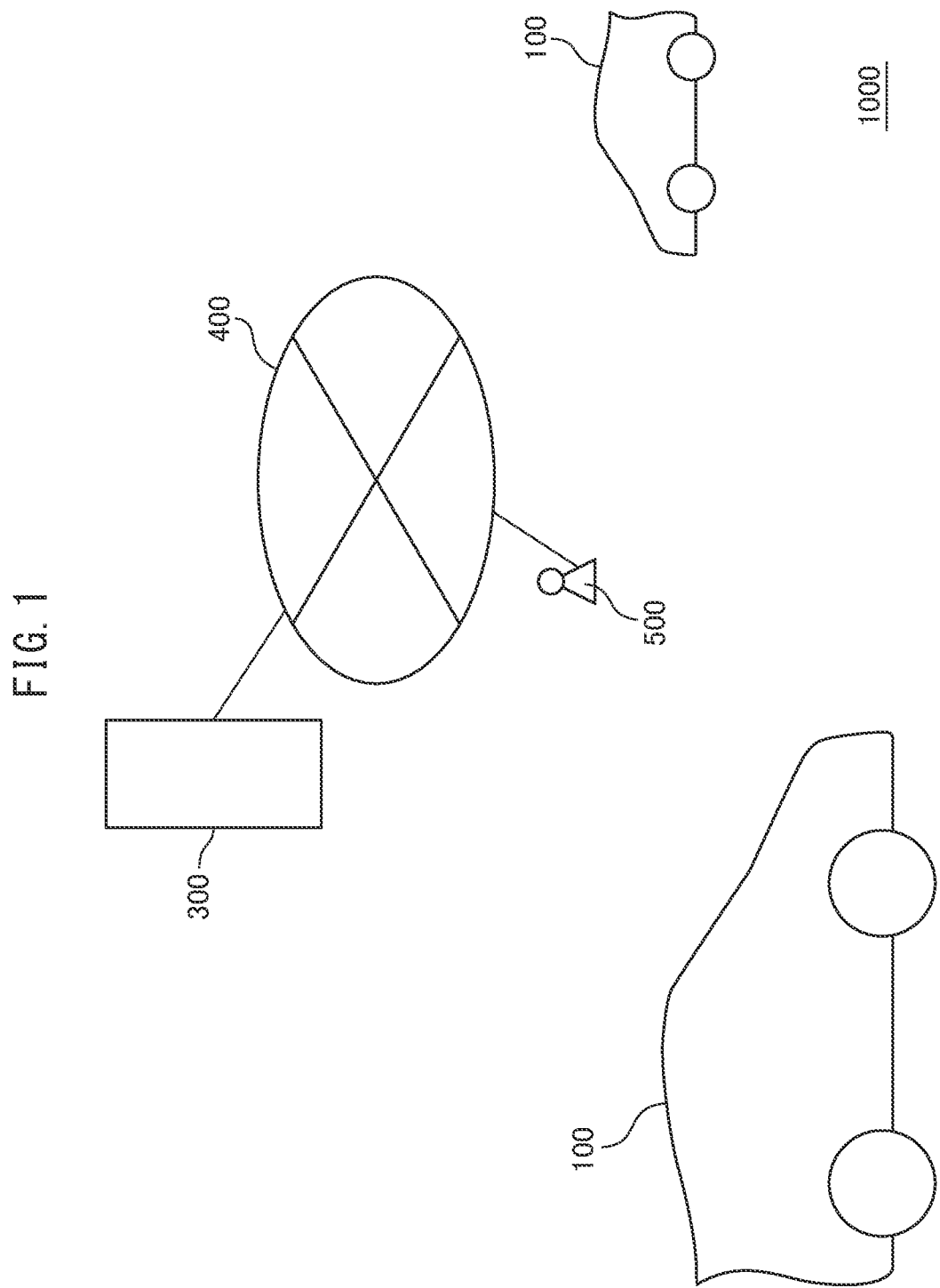
FIG. 1 is a schematic diagram illustrating a configuration of a map information distribution system implemented with a change point detection device according to one embodiment.

FIG. 1 is a schematic diagram illustrating a configuration of a map information distribution system 1000 implemented with a change point detection device according to one embodiment. The map information distribution system 1000 includes a plurality of vehicles 100 that are examples of automatedly driven vehicles capable of autonomous traveling, and a server 300. Each of the vehicles 100 and the server 300 are communicable with each other via a communication network 400 constituted of an optical communication line or the like, and a wireless base station 500 connected to the communication network 400 via a gateway (not illustrated). In other words, the wireless base station 500 relays communication between each of the vehicles 100 and the server 300. As one example, the change point detection device is mounted on each of the vehicles 100. In the map information distribution system 1000, map information is updated to latest information on the basis of a change point. Note that, in the present embodiment, each of the vehicles 100 has the same configuration in relation to change point detection processing, the server 300 applies the same processing to each of the vehicles 100, and therefore, one vehicle 100 is described below unless otherwise needed.

The server 300 is included in a management center. The management center provides various kinds of information such as map information to the plurality of vehicles 100 using the server 300. The management center also collects, using the server 300, information relating a change point detected by each of the vehicles 100, and distributes the information relating the change point or updated map information to each of the vehicles 100. In addition to these, the management center also performs various kinds of processing for controlling each of the vehicles 100 using the server 300.

Figure 2:
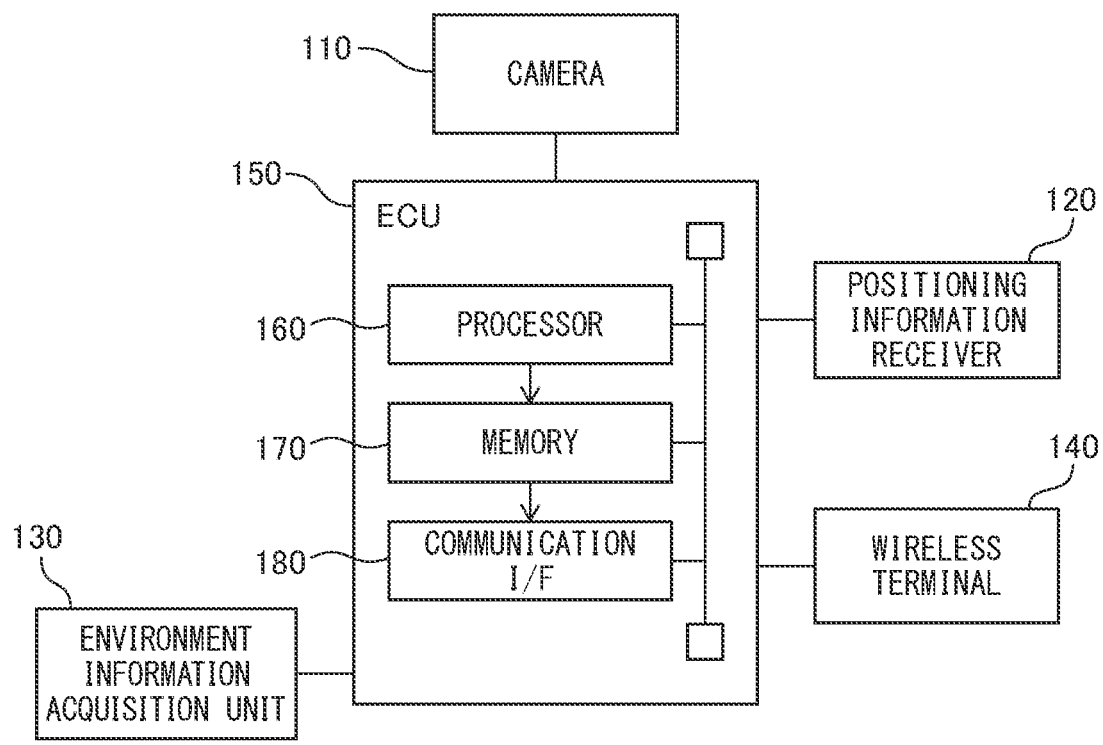
FIG. 2 is a schematic diagram illustrating a configuration of a vehicle control system mounted on a vehicle.

FIG. 2 is a schematic diagram illustrating a configuration of a vehicle control system mounted on the vehicle 100. The vehicle control system includes an in-vehicle camera 110, a positioning information receiver 120, an environment information acquisition unit 130, a wireless terminal 140, and an electronic control unit (ECU) 150. The ECU 150 is one example of a change point detection device. The in-vehicle camera 110, the positioning information receiver 120, the environment information acquisition unit 130, the wireless terminal 140, and the ECU 150 are each communicably connected via an in-vehicle network compliant with such a standard as a controller area network (CAN) and Ethernet.

The in-vehicle camera 110 is one example of an imaging unit, and includes a two-dimensional detector constituted of an array of photoelectric conversion elements, such as a CCD or a C-MOS, having sensitivity to visible light, and an image formation optical system that forms, on the two-dimensional detector, an image of a region to be a photography target. The in-vehicle camera 110 is provided in such a place as a dashboard inside a vehicle or a vicinity of a windshield, captures a place around the vehicle 100 (e.g., in front of the vehicle 100) at each predetermined capturing period (e.g., ⅓₀ seconds to ⅒ seconds), and generates an image representing an environment around the vehicle 100. An image acquired by the in-vehicle camera 110 is preferably a color image. Moreover, the in-vehicle camera 110 may be constituted of a stereo camera, or may be configured to acquire, from a parallax of left and right images, a distance to each structure on an image. Whenever the in-vehicle camera 110 generates an image, the in-vehicle camera 110 outputs the generated image to the ECU 150 via the in-vehicle network.

The positioning information receiver 120 acquires positioning information representing a current position and posture of the vehicle 100. For example, the positioning information receiver 120 can be a global positioning system (GPS) receiver. Whenever the positioning information receiver 120 receives positioning information, the positioning information receiver 120 outputs the acquired positioning information to the ECU 150 via the in-vehicle network.

The environment information acquisition unit 130 mainly acquires information (hereinafter, referred to as environment information) representing an environment around the vehicle 100. The environment information acquisition unit 130 includes an outside air temperature sensor, an illuminance sensor that detects an illuminance outside the vehicle 100, a rainfall sensor that detects a rainfall amount outside the vehicle 100, and the like.

Note that, in addition to detection values detected by these sensors, environment information also includes a control value related to vehicle stability control, such as an anti-lock braking system (AVS), a vehicle stability control (VSC) system, and a traction control (TRC) system. Note that detection values detected by a wheel speed sensor, a brake oil pressure sensor, and the like are used in the vehicle stability control. Environment information also includes a control value indicating an operating state of a wiper of the vehicle 100, a set value (a set value indicating either a high beam or a low beam) of an indication signal of a headlight, and the like. Further, environment information may include a determination value for a weather condition or a road surface condition by image recognition (including ones by machine learning). The detection value, control value, set value, determination value, and the like are values that change in association with an environment around the vehicle 100, and the environment information acquisition unit 130 acquires these values. Therefore, the environment information acquisition unit 130 may be, for example, an ECU provided in addition to the ECU 150, or the ECU 150 itself, other than the sensors described above. The environment information acquisition unit 130 outputs the acquired environment information to the ECU 150 via the in-vehicle network.

The wireless terminal 140 includes, for example, an antenna, and a signal processing circuit that executes various kinds of processing associated with wireless communication, such as modulation and demodulation of a wireless signal. The wireless terminal 140 receives a downlink wireless signal from the wireless base station 500, and transmits an uplink wireless signal to the wireless base station 500. In other words, the wireless terminal 140 extracts, from the downlink wireless signal received from the wireless base station 500, a signal (e.g., map information, information about a change point, information about a blacklist that will be described later, and the like) to be transmitted from the server 300 to the vehicle 100, and transfers the signal to the ECU 150. The wireless terminal 140 also generates an uplink wireless signal including a signal (e.g., a current position and posture of the vehicle 100, information relating to a change point, an image captured by the in-vehicle camera 110, a superimposition image in which an image is superimposed over map information, environment information, and the like) that has been received from the ECU 150 and that is to be transmitted to the server 300, and transmits the generated wireless signal.

The ECU 150 includes a processor 160, a memory 170, and a communication interface 180. The processor 160 includes one or a plurality of central processing units (CPUs) and peripheral circuits therearound. The processor 160 may further include another arithmetic circuit, such as a logical arithmetic unit, a numerical arithmetic unit, or a graphics processing unit. The memory 170 is one example of a storage unit, and includes, for example, a volatile semiconductor memory and a non-volatile semiconductor memory. The memory 170 stores information such as map information and an internal parameter of the in-vehicle camera 110. The map information is information representing structures (hereinafter, simply referred to as structures) associated with a traveling condition on and around a road where a vehicle travels, and includes three-dimensional position information of the structures. Note that the structures include, for example, a traffic sign such as a lane division line or a road boundary line drawn on a road surface, a road sign, a traffic light, a curb or a wall at a road end, a building near a road, and the like. The internal parameter includes an attachment position of the in-vehicle camera 110 in the vehicle 100, a posture of the in-vehicle camera 110 toward the vehicle 100, a focal distance of the in-vehicle camera 110, and the like. The communication interface 180 includes an interface circuit for connecting the ECU 150 to the in-vehicle network. Note that change point detection processing by the ECU 150 will be described later.

Figure 3:
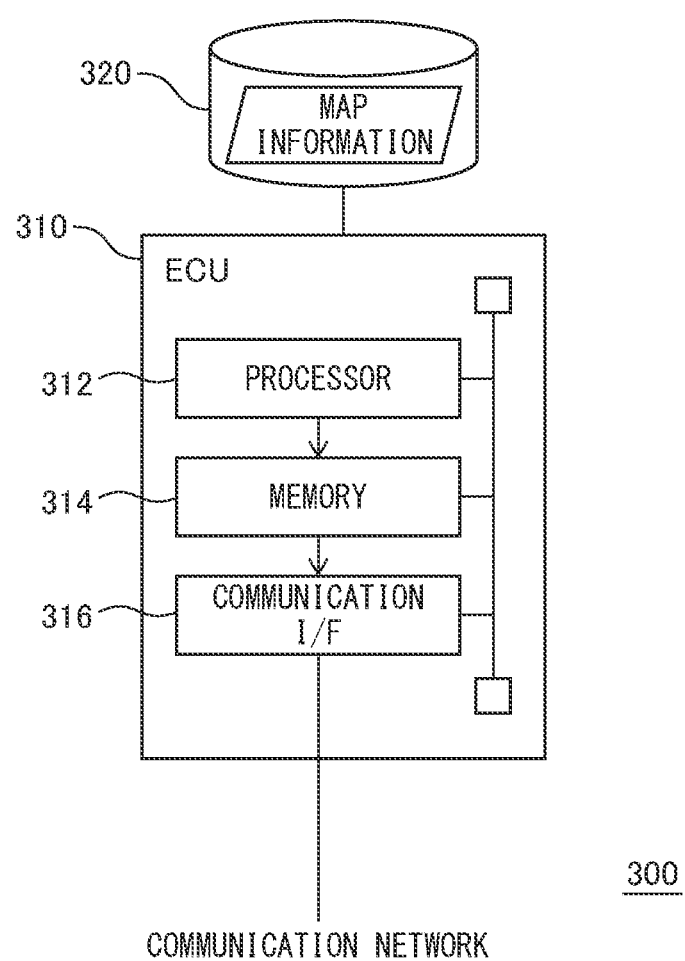
FIG. 3 is a schematic diagram illustrating a configuration of a server.

FIG. 3 is a schematic diagram illustrating a configuration of the server 300. The server 300 includes a control device 310 and a storage device 320.

The control device 310 includes a processor 312, a memory 314, and a communication interface 316. The processor 312 includes one or a plurality of central processing units (CPUs) and peripheral circuits therearound. The processor 312 may further include another arithmetic circuit, such as a logical arithmetic unit, a numerical arithmetic unit, or a graphics processing unit. The memory 314 includes, for example, a volatile semiconductor memory and a non-volatile semiconductor memory. The communication interface 316 includes an interface circuit for connecting the control device 310 to a network inside the server 300, or the communication network 400. The communication interface 316 is configured to be communicable with the vehicle 100 via the communication network 400 and the wireless base station 500. In other words, the communication interface 316 transfers, to the processor 312, information received from the vehicle 100 via the wireless base station 500 and the communication network 400. The communication interface 316 transmits the information received from the processor 312, to the vehicle 100 via the communication network 400 and the wireless base station 500.

The storage device 320 is one example of a storage unit (memory), and includes, for example, a hard disk device, or an optical recording medium and an access device thereof. The storage device 320 stores map information. The storage device 320 also stores various kinds of information to be utilized by the map information distribution system 1000. The storage device 320 may further store a computer program for executing processing that is executed on the processor 312. Note that the storage device 320 is constituted of a hard disk drive and the like. Processing that is performed on the server 300 will be described later.

Figure 4:
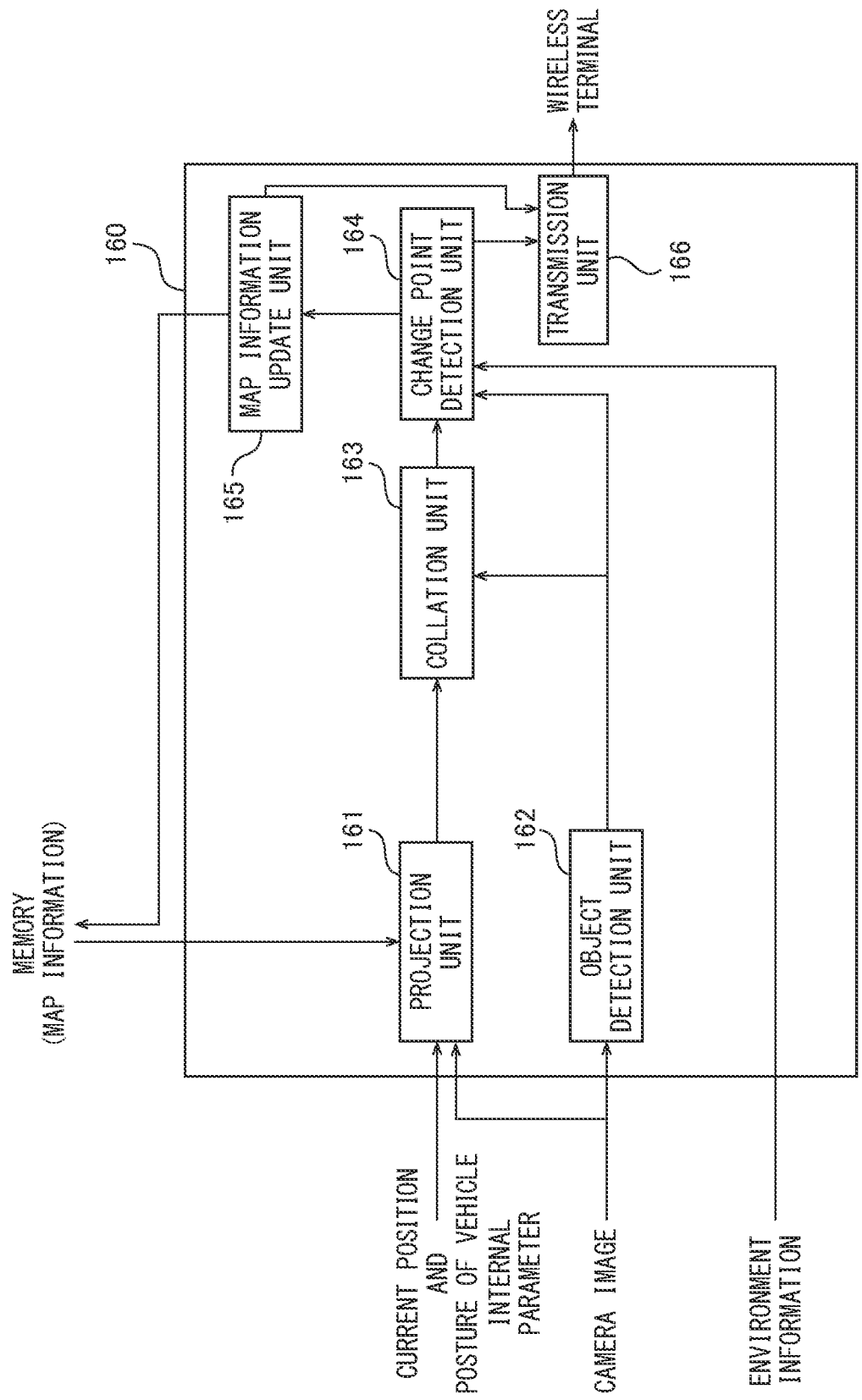
FIG. 4 is a schematic diagram illustrating functional blocks relating to change point detection processing of a processor.

Details of change point detection processing are described below. FIG. 4 is a schematic diagram illustrating functional blocks relating to change point detection processing of the processor 160. The processor 160 includes a projection unit 161, an object detection unit 162, a collation unit 163, a change point detection unit 164, a map information update unit 165, and a transmission unit 166. Each of these units included in the processor 160 is, for example, a functional module achieved by a computer program operating on the processor 160. In other words, each of these units included in the processor 160 is constituted of the processor 160 and a program (software) for causing the processor 160 to function. The program may be recorded in the memory 170 included in the ECU 150 or a recording medium connected from outside. Alternatively, each of these units included in the processor 160 may be a dedicated arithmetic circuit provided in the processor 160.

By the configuration illustrated in FIG. 4, the processor 160 collates an image acquired from the in-vehicle camera 110 with map information, and calculates a coincidence degree between the image and the map information. Then, the processor 160 detects a change point when the coincidence degree is less than or equal to a predetermined threshold value. When an actual structure changes relative to a structure represented in the map information, a change point is detected by collating the image with the map information. In this case, the map information is updated in order to reflect the change of the actual structure in the map information.

Figure 5:
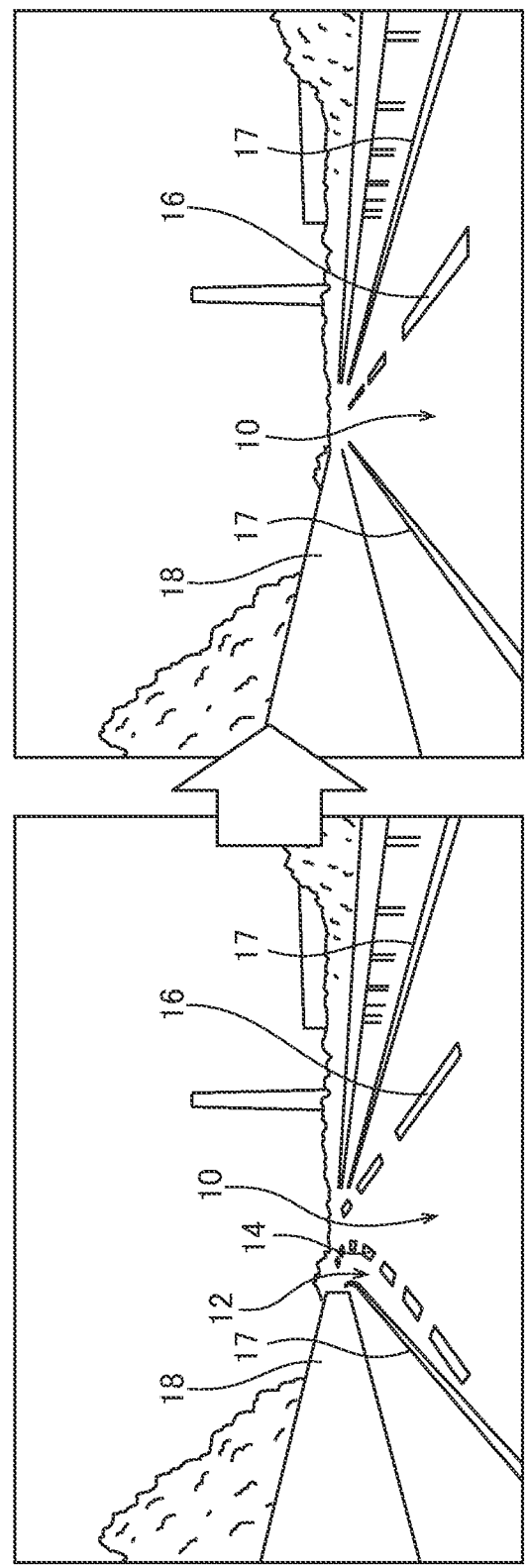
FIG. 5 is a schematic diagram illustrating an example in which map information is updated.

FIG. 5 is a schematic diagram illustrating an example in which map information is updated. As an example in which a structure has changed, a case is cited and described where there are changes in structures such as a division line 14 provided on a road 10 and dividing a branch road 12 and the road 10, a road boundary line 17 indicating a boundary between a road shoulder and the road 10 or a boundary between a median strip and the road 10, and a wall 18 on a left side of the road 10.

FIG. 5 illustrates images that the in-vehicle camera 110 captures a vehicle front and generates, when the vehicle 100 travels on the road 10 having two lanes on each side. The images illustrated on left and right are captured in a condition where a position and a posture of the vehicle 100 and an internal parameter are the same, but timings of capturing are different. In the left-side image in FIG. 5, the branch road 12 exists on the left side of the two-lane road 10, and the division line 14 exists along a boundary between the lane of the road 10 and the branch road 12. The vehicle 100 traveling on the road 10 can move in a direction different from the road 10 by crossing the division line 14 and moving into the branch road 12. Note that the road 10 is divided into two lanes by a division line 16.

On the other hand, the right-side image in FIG. 5 is captured after the branch road 12 is discontinued, and the division line 14 disappears. In the right-side image in FIG. 5, because the branch road 12 is discontinued, shapes of the wall 18 and the road boundary line 17 which indicates the boundary between the road shoulder and the road 10 also change.

In addition to structures such as the branch road 12, the division lines 14 and 16, and the wall 18 on the left side of the road 10 illustrated in FIG. 5, map information represents three-dimensional positions of structures such as a road sign and a traffic light as coordinates of a feature point group by, for example, a world coordinate system.

Immediately after structures such as the branch road 12 and the division line 14 disappear, map information still represents information about structures such as the branch road 12 and the division line 14. Thus, erroneous information is given to the vehicle 100 referring to the map information, and the vehicle control system referring to the map information recognizes that the branch road 12, the division line 14, and the like still exist.

On the other hand, whenever an image that the in-vehicle camera 110 captures and generates is acquired, the processor 160 sequentially collates the image with map information, and detects a change point between the image and the map information. When an image that is captured after structures such as the branch road 12 and the division line 14 disappear is collated with map information, a change point is detected. By updating the map information on the basis of the change point, the map information reflects disappearance of structures such as the branch road 12 and the division line 14.

Figure 6:
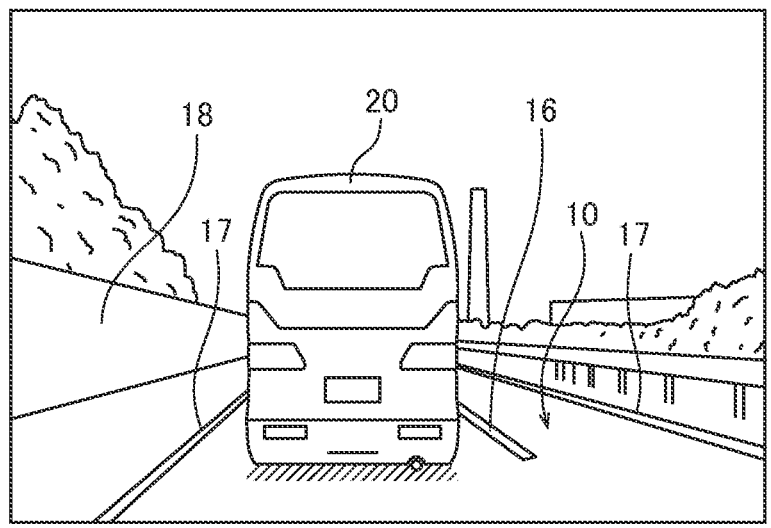
FIG. 6 is a schematic diagram illustrating a state where a shielding object is contained in an image acquired by capturing with an in-vehicle camera.

FIG. 6 is a schematic diagram illustrating a state where a shielding object 20 is contained in an image captured after structures such as the branch road 12 and the division line 14 disappear. In the example illustrated in FIG. 6, the shielding object 20 is a large-sized bus that is a preceding vehicle, and parts of structures such as the division line 16, the road boundary line 17, and the wall 18 are hidden by the shielding object 20. Even when the map information already reflects disappearance of structures such as the branch road 12 and the division line 14, but the shielding object 20 is contained in the image, a coincidence degree between the image and the map information is determined to be low when the image is collated with the map information, and erroneous detection is performed assuming that a change point is present.

Thus, when detecting, from an image of the in-vehicle camera 110 illustrated in FIG. 6, the shielding object 20 hiding a structure, and collating the image with map information, the processor 160 calculates a coincidence degree between the image and the map information by performing the collation after eliminating, from a collation target, structures hidden by the shielding object 20 (in the example in FIG. 6, the division line 16, the road boundary line 17, the wall 18, and the like that are hidden behind the shielding object 20) among structures represented in the map information. When the coincidence degree is less than or equal to a predetermined threshold value, the processor 160 determines that the structure represented in the image has a change point different from a corresponding structure represented in the map information.

Thus, no change point is detected with regard to the structure hidden by the shielding object 20, and therefore, even when the shielding object 20 hiding a structure exists, a change point is accurately detected. Moreover, with regard to structures represented in map information and hidden by the shielding object 20, erroneous updating of information about these structures is constrained.

Processing that is performed by the processor 160 is described below in detail. The processor 160 sequentially acquires an image generated by the in-vehicle camera 110 at each predetermined capturing period described above, and positioning information relating to a current position and posture of the vehicle 100 received by the positioning information receiver 120.

By projecting three-dimensional map information stored in the memory 170 on an image generated by the in-vehicle camera 110, the projection unit 161 of the processor 160 converts the map information into two-dimensional information. In this instance, a structure represented in the map information is projected on the image on the basis of a current position and posture of the vehicle 100 and an internal parameter. More specifically, the projection unit 161 projects a structure around the vehicle 100 represented in the map information on the image generated by the in-vehicle camera 110, assuming a position and posture of the vehicle 100. For example, the projection unit 161 sets, as an assumed position and an assumed posture of the vehicle 100, a position of the vehicle 100 represented by latest positioning information received from the positioning information receiver 120 and a posture of the vehicle 100 equivalent to a traveling direction of the vehicle 100 obtained by a plurality of pieces of most recent positioning information. The projection unit 161 derives an equation of conversion from a world coordinate system into a camera coordinate system having a position of the in-vehicle camera 110 as an origin and having an optical direction of the in-vehicle camera 110 as one axial direction, in response to the assumed position and assumed posture, and an internal parameter. Such a conversion equation is represented by a combination of a rotation matrix representing rotation between coordinate systems and a translation vector representing a translation between coordinate systems. Then, in accordance with the conversion equation, the projection unit 161 converts, into a coordinate of the camera coordinate system, a coordinate of a structure on a road around the vehicle 100 included in the map information and represented by the world coordinate system. Then, on the basis of an internal parameter, the projection unit 161 projects, on the image, the structure converted into the coordinate of the camera coordinate system. Consequently, a superimposition image in which the structure represented in the map information is superimposed over the image acquired by the in-vehicle camera 110 is generated.

Note that the projection unit 161 may identify a region photographable with the in-vehicle camera 110 out of a structure represented by the map information on the basis of the assumed position and assumed posture of the vehicle 100 and the internal parameter, and convert only the identified structure into a camera coordinate system. For example, a region having a position of the in-vehicle camera 110 as an origin and determined by a field angle (focal distance) of the in-vehicle camera 110 is set as a photographable region. Consequently, coordinate conversion and projection are performed after a range that may not be captured by the in-vehicle camera 110 is eliminated, and therefore, a processing load by the projection unit 161 is reduced.

The object detection unit 162 detects a structure around the vehicle 100 from an image generated by the in-vehicle camera 110. For example, the object detection unit 162 detects a structure represented in an image, by inputting the image to a discriminator. For example, the object detection unit 162 can use, as a discriminator, a discriminator for segmentation previously learned in such a way as to output, from an input image, a likelihood that, with regard to each pixel of the image, and for each kind of object having a possibility of being represented by the pixel, the object is represented by the pixel, and discriminate that an object having the maximum likelihood is represented. As such a discriminator, the object detection unit 162 can use, for example, a deep neural network (DNN) having an architecture of a convolutional neural network (CNN) type for segmentation, such as a fully convolutional network (FCN). Alternatively, the object detection unit 162 may utilize a discriminator for segmentation conforming to another machine learning technique such as a random forest or a support vector machine. In this case, the object detection unit 162 identifies, by inputting an image to the discriminator for segmentation, a pixel containing a structure in the image. Then, the object detection unit 162 sets a cluster of images containing the same kind of structure as a region representing the structure.

Alternatively, the object detection unit 162 may apply an edge detection filter such as a Sobel filter to an image, and detect an edge pixel representing an edge from the image, as a feature point. The object detection unit 162 may detect a straight line from an image by executing Hough transform for a cluster of edge pixels. Then, when a straight line detected from the image is extended along a traveling direction of the vehicle 100, the object detection unit 162 may detect the straight line as a lane division line that is one example of a structure on a road.

The object detection unit 162 also detects the shielding object 20 by inputting an image to a discriminator. In this instance, the object detection unit 162 may use a discriminator previously learned in such a way as to detect, from an input image, the shielding object 20 represented in the image, separately from the discriminator used for detection of a structure. As such a discriminator, the object detection unit 162 can use, for example, a DNN having an architecture of a convolutional neural network (CNN) type, such as a single shot multibox detector (SSD) or a faster R-CNN.

The object detection unit 162 detects a feature point representing a structure, by performing edge detection processing for an image in a region where a detected structure is represented. The object detection unit 162 outputs, to the collation unit 163, a kind of detected structure, information representing a region where the structure is represented (e.g., a bit map indicating a region where the structure is represented), and a feature point.

The collation unit 163 collates a structure that is projected on an image generated by the in-vehicle camera 110 and that is represented on map information, with a structure detected from the image generated by the in-vehicle camera 110, and calculates a coincidence degree therebetween. In this instance, after eliminating a structure hidden by the shielding object 20 from a collation target, the collation unit 163 collates the structure represented in map information with a structure detected from the image generated by the in-vehicle camera 110.

For example, when the object detection unit 162 detects a feature point of a structure from an image, the collation unit 163 calculates a coincidence degree between a structure represented in map information and a structure detected from an image generated by the in-vehicle camera 110, by performing matching for finding whether a feature point of the image coincides with a feature point of the map information, and calculating a ratio of the number of coinciding feature points to the total number of feature points in a superimposition image. In this case, for example, a coincidence degree is calculated from the following equation.

Coincidence degree=the number of feature points whose distances to any of feature points detected from an image are less than or equal to a predetermined value, among feature points in map information/the total number of feature points set with regard to map information Note that, when a bit map representing a structure is acquired from the object detection unit 162, the collation unit 163 may calculate a coincidence degree between a structure represented in map information and a structure detected from an image, by a known technique of template matching.

When calculating a coincidence degree, the collation unit 163 performs processing of eliminating a structure hidden by the shielding object 20 from a collation target among structures represented in map information, when the shielding object 20 is detected by the object detection unit 162. Consequently, a region on map information hidden by the shielding object 20 is excluded from the calculation of a coincidence degree.

For example, in a case of an image by the in-vehicle camera 110 illustrated in FIG. 6, a large-sized bus is detected as the shielding object 20 by the object detection unit 162. The collation unit 163 eliminates structures hidden by the shielding object 20 (the road 10, the division line 16, the road boundary line 17, the wall 18, and the like that are hidden behind the shielding object 20) from a collation target. Then, the collation unit 163 collates an image acquired by the in-vehicle camera 110 with map information from which structures hidden by the shielding object 20 are eliminated, and thereby calculates a coincidence degree between the image and the map information.

In this instance, the collation unit 163 can eliminate a structure hidden by the shielding object 20 from a collation target, by eliminating, from the collation target, a structure located in a region of the shielding object 20 detected in an image, in a state where a structure represented in map information is superimposed over an image by the in-vehicle camera 110.

Note that, considering a fact that a position of the shielding object 20 detected by the object detection unit 162 includes an error, and the like, the collation unit 163 may eliminate, from a collation target, a structure included in a region larger than the detected shielding object 20.

The projection unit 161 executes each piece of processing of coordinate system conversion and projection similar to the above, in a plurality of assumed positions and assumed postures, while changing an assumed position and an assumed posture by a predetermined amount. The collation unit 163 may identify an assumed position and an assumed posture when a coincidence degree becomes maximum, and estimate the assumed position and assumed posture as an actual position and posture of the vehicle 100. Note that a value estimated by the collation unit 163 may be corrected by applying a movement amount of the vehicle 100 acquired from a wheel speed sensor and a change in a yaw angle of the vehicle 100 acquired from an angular speed sensor to an actual position and posture of the vehicle 100 estimated by the collation unit 163. The actual position and posture of the vehicle 100 estimated in this way are usable in automated driving of the vehicle 100. In other words, a control system of the vehicle 100 can perform automated driving in such a way that the vehicle 100 travels on a desired route, by controlling an accelerator, a brake, and steering with reference to map information, on the basis of the estimated actual position and posture of the vehicle 100.

The coincidence degree calculated by the collation unit 163 is sent to the change point detection unit 164. The change point detection unit 164 compares the coincidence degree with a predetermined threshold value. Note that the collation unit 163 may calculate a coincidence degree between a structure represented in map information and a structure detected from an image, and derive a maximum value of the coincidence degree, with regard to each of a plurality of assumed positions and assumed postures, while estimating an actual position and posture of the vehicle 100. In this case, the maximum value of the coincidence degree is sent to the change point detection unit 164, and the change point detection unit 164 compares the maximum value of the coincidence degree with a predetermined threshold value.

When the coincidence degree is less than or equal to the predetermined threshold value, the change point detection unit 164 determines that the structure represented in the image has a change point different from a corresponding structure represented in the map information. For example, in a case of the feature point matching described above, a feature point that does not coincide with a feature point in map information among feature points of an image by the in-vehicle camera 110 is equivalent to a change point. Alternatively, a feature point that does not coincide with a feature point of an image by the in-vehicle camera 110 among feature points in map information is equivalent to a change point. In a case of template matching, a coincidence degree is derived for each matched region, and a region having a coincidence degree less than or equal to a threshold value is set as a change point.

On the other hand, depending on a structure, a change point may not be detected by only collating an image with map information. For example, a traffic sign that is one example of a structure on a road becomes blurred and invisible as deterioration progresses. However, when a part of a traffic sign is blurred, an influence of the blurring on a coincidence degree is low. Thus, when an attempt is made to detect a change point resulting from blurring by collating an image with map information, but the image and the map information coincide with each other as a whole, there is a possibility that a coincidence degree exceeds a predetermined threshold value. Therefore, blurring of a traffic sign may not be detected as a change point in the method described above.

Thus, when a change point resulting from blurring of a traffic sign is detected, the collation unit 163 separates an image into a plurality of partial images, and calculates a degree of partial coincidence with a corresponding partial region on map information for each partial image. Note that processing of calculating a partial coincidence degree for each partial image is performed in a manner similar to the above-described calculation of a coincidence degree. When a difference between an image and map information results from blurring of a traffic sign, a coincidence degree in a case of collating the whole image with the map information becomes greater than the predetermined threshold value, as a result of the collation by the collation unit 163. On the other hand, when a blurred traffic sign exists in a partial image, a partial coincidence degree in the partial image becomes less than or equal to a predetermined threshold value (partial coincidence degree threshold value). Therefore, when a partial coincidence degree becomes less than or equal to the partial coincidence degree threshold value, the change point detection unit 164 determines that a change point resulting from blurring of a traffic sign is present between a structure represented in the partial image and a structure represented in a corresponding partial region on map information.

Figure 7:
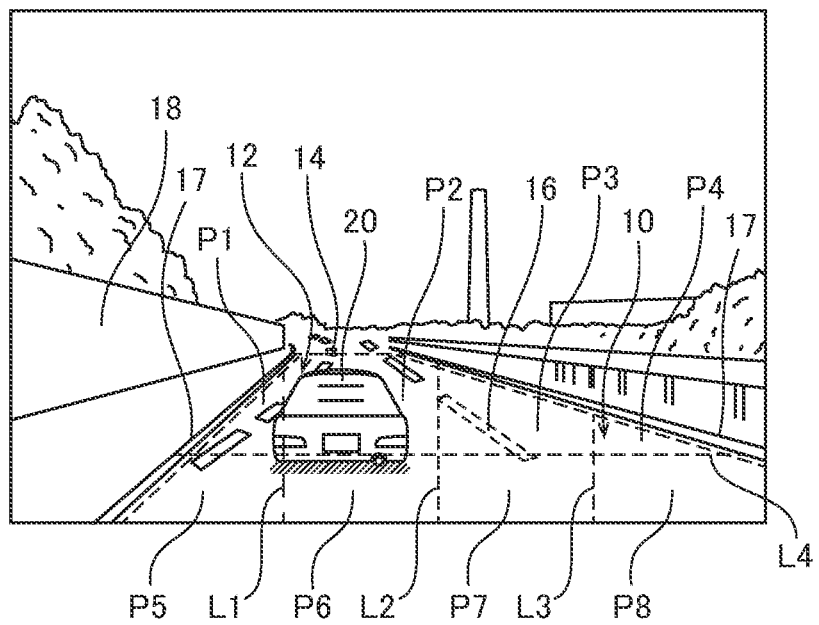
FIG. 7 is a schematic diagram illustrating one example of a technique for detecting blurring of a division line.

FIG. 7 is a schematic diagram illustrating one example of a technique for detecting blurring of a division line as a traffic sign. Herein, the image illustrated on the left side of FIG. 5 is cited as an example, and a case is described where blurring occurred in the division line 16 that divides the road 10 into two lanes is detected as a change point.

In the example illustrated in FIG. 7, a region of the road 10 is separated into eight partial images P1 to P8 across broken lines L1 to L4 in an image. The collation unit 163 collates each of the partial images P1 to P8 with a corresponding partial region in map information, and derives a partial coincidence degree.

Herein, it is assumed that, among the division lines 16 that divide the road 10 into two lanes, only the division line 16 (indicated with a broken line in FIG. 7) represented in the partial image P3 is blurred. In this instance, a coincidence degree when the whole image is collated with the map information becomes greater than a predetermined threshold value. With regard to each of the partial images P1, P2, P4, P5, P6, P7, and P8, no blurred division line 16 exists in the image, or a region that the blurred division line 16 accounts for in the image is very small. Therefore, a partial coincidence degree acquired by collating each of the partial images P1, P2, P4, P5, P6, P7, and P8 with a corresponding partial region in map information becomes greater than the partial coincidence degree threshold value.

On the other hand, with regard to the partial image P3, the blurred division line 16 accounts for a large region in a partial image, and therefore, a partial coincidence degree acquired by collating the partial image P3 with a corresponding partial region in map information becomes smaller than the partial coincidence degree threshold value. Therefore, as a result of the collation by the collation unit 163, the change point detection unit 164 detects a change point resulting from blurring of a traffic sign, between the partial image P3 and the corresponding partial region in the map information. For example, in a case of the feature point matching described above, the change point detection unit 164 detects, as a change point resulting from blurring, a feature point that does not coincide with a feature point of a corresponding partial region in the map information, among feature points of a partial image.

Note that, in the example in FIG. 7, with regard to each of the partial images P1, P2, P5, and P6, a preceding vehicle is contained in the image as the shielding object 20, and therefore, the collation unit 163 calculates a partial coincidence degree between the partial image and map information by performing collation after eliminating, from a collation target, a structure hidden by the shielding object 20 in the map information.

FIG. 8 is a flowchart illustrating change point detection processing that is performed by the processor 160 of the ECU 150. The processing in FIG. 8 is executed by the processor 160 at each predetermined control period. First, the object detection unit 162 detects the shielding object 20 from an image acquired by the in-vehicle camera 110 (step S100). Next, the collation unit 163 eliminates a structure hidden by the shielding object 20 in map information, collates the image acquired by the in-vehicle camera 110 with a corresponding region on the map information, and calculates a coincidence degree (step S102).

Next, the change point detection unit 164 determines whether the coincidence degree is less than or equal to a predetermined threshold value (step S104), and moves to step S106 when the coincidence degree is less than or equal to the predetermined threshold value. In step S106, the change point detection unit 164 detects a change point between a structure represented in an image and a corresponding structure on map information. The processing is finished after step S106. When the coincidence degree is more than the predetermined threshold value in step S104, the processing is finished.

By the processing described above, when the shielding object 20 hiding a structure is detected from an image generated by the in-vehicle camera 110, the processor 160 calculates a coincidence degree by collating the image generated by the in-vehicle camera 110 with map information, after eliminating the structure hidden by the shielding object 20 from a collation target. Thus, even when a structure is hidden by the shielding object 20, a coincidence degree between an image and map information is accurately calculated. Therefore, a change point between a structure represented in an image and a structure represented in map information is detected with precision on the basis of the coincidence degree.

The map information update unit 165 updates map information on the basis of a change point detected by the change point detection unit 164. For example, the map information update unit 165 converts a change point detected on a superimposition image into a coordinate on a camera coordinate system. Then, the map information update unit 165 acquires a coordinate of a change point represented on a world coordinate system by converting the coordinate of the change point represented on a camera coordinate system into a world coordinate system. Then, the map information update unit 165 updates map information on the basis of the coordinate of the change point represented on the world coordinate system. In this instance, for example, when a feature point that does not coincide with a feature point in map information is detected as a change point among feature points of an image by the in-vehicle camera 110, the map information update unit 165 updates map information in such a way that a structure after change is represented by the coordinate of the change point. The map information update unit 165 may update map information on the basis of information about a kind of structure discriminated by the object detection unit 162 and corresponding to a position of a change point, in addition to the coordinate of the change point. The updated map information is stored in the memory 170.

The transmission unit 166 transmits information (a coordinate of the change point, a kind of structure corresponding to the change point, and the like) relating to a change point to the wireless base station 500 via the wireless terminal 140, together with a flag indicating that the change point is detected. The transmitted information relating to the change point is acquired by the server 300. In this instance, a superimposition image in which a structure on an image is superimposed over a structure represented in map information may be transmitted to the server 300 as an evidence. Consequently, convincingness of a detection result of the change point is improved on the server 300. The information relating to the change point is stored in the storage device 320 of the server 300. The server 300 transmits the information relating to the change point, to each of the vehicles 100. Therefore, each of the vehicles 100 can update map information owned by each of the vehicles 100, on the basis of the information relating to the change point.

The transmission unit 166 transmits the map information updated by the map information update unit 165 to the wireless base station 500 via the wireless terminal 140. The updated map information is acquired by the server 300, and stored in the storage device 320. The server 300 transmits the updated map information to each of the vehicles 100. Therefore, each of the vehicles 100 can perform automated driving by utilizing the updated map information.

As described above, according to the present embodiment, when the shielding object 20 hiding a structure is detected from an image generated by the in-vehicle camera 110, the structure hidden by the shielding object 20 is eliminated from a collation target, and map information is collated with the image. Thus, even when a structure is hidden by the shielding object 20, a coincidence degree between an image and map information is accurately calculated. Therefore, when a change point where a structure represented in map information is different from an actual structure is present, the change point is detected with precision.

Modification Example

Even when a coincidence degree between an image and map information is less than or equal to a predetermined threshold value, the processor 160 may determine that a change point is present only when a structure is distinguishable from the image. When a structure may not be distinguished from the image, there is a possibility that, even though a coincidence degree between the image and map information is low, lowness of the coincidence degree results from a fact that the structure may not be distinguished from the image. Thus, the change point detection unit 164 determines whether the structure is distinguishable from the image, on the basis of information acquired by the environment information acquisition unit 130, or a size of a region where the shielding object 20 in the image is represented. Only when determining that the structure is distinguishable from the image, the change point detection unit 164 determines that a change point is generated between the image by the in-vehicle camera 110 and the map information.

For example, when an illuminance acquired from an illuminance sensor is more than a predetermined threshold value, or when the illuminance has reached a vicinity of a measurable upper limit value, the change point detection unit 164 determines that the in-vehicle camera 110 is in such a condition that the in-vehicle camera 110 is backlight or exposed to the afternoon sun, and a structure may not be distinguished from an image. Note that the change point detection unit 164 may determine that the in-vehicle camera 110 is exposed to the afternoon sun, from a fact that a direction of a vehicle front acquired from the positioning information receiver 120 is westward and that a time is a time of sunset (evening). The change point detection unit 164 may determine, on the basis of a statistic value of luminance of each pixel represented in an image, that a structure may not be distinguished from the image, as a statistic value of luminance is lower. When a statistic value of luminance has reached a vicinity of an upper limit value as in a case of backlight, the change point detection unit 164 may determine that a structure may not be distinguished from an image.

Since it is more difficult to distinguish a structure in an image due to the rainfall when an operation speed of a windshield wiper is faster, the change point detection unit 164 determines that the structure may not be distinguished from the image when the operation speed of the windshield wiper is more than a predetermined threshold value. Since it becomes more difficult to distinguish a structure on an image as an amount of rain is heavier, the change point detection unit 164 determines that the structure may not be distinguished from the image when the amount of rainfall detected by a rainfall sensor is more than a predetermined threshold value.

Since it is supposed on the basis of a detection value of an outside air temperature sensor that a road surface is covered with snow or ice when temperature is less than or equal to a predetermined threshold value, the change point detection unit 164 determines that a structure may not be distinguished from an image. Since it is supposed on the basis of operation information related to vehicle stability control, such as an anti-lock braking system (AVS), a vehicle stability control (VSC) system, and a traction control (TRC) system that a road surface is covered with snow or ice when operation frequencies of these systems are more than a predetermined threshold value, the change point detection unit 164 determines that a structure may not be distinguished from an image. Note that, when a road surface is covered with snow or ice, it is particularly difficult to distinguish a structure on a road, such as a traffic sign.

Since traveling on a dark road is supposed on the basis of a set value of an indication signal of a headlight when a ratio of a time in which the headlight is set to a high beam to a time in which the headlight is turned on is more than a predetermined threshold value, the change point detection unit 164 determines that a structure may not be distinguished from an image. Further, when a weather condition or a road surface condition is not good, the change point detection unit 164 determines that a structure may not be distinguished from an image on the basis of a determination value of the weather or road surface condition by image recognition.

When a size of a region where the shielding object 20 is represented in an image is larger than a predetermined threshold value, the change point detection unit 164 determines that a structure may not be distinguished from the image. For example, in the example illustrated in FIG. 6, when a distance to a large-sized bus that is the shielding object 20 is shorter, a region where the shielding object 20 is represented in an image becomes very large, and a structure may not be distinguished from the image. As one example, when an area of the shielding object 20 is equal to or more than ½ of a total area of an image generated by the in-vehicle camera 110, the change point detection unit 164 determines that a structure may not be distinguished from the image.

On the basis of a size of a structure, the change point detection unit 164 determines that a structure may not be distinguished from an image, with regard to a structure having a minute size. For example, the change point detection unit 164 determines that a structure may not be distinguished from an image, with regard to a structure having a size smaller than a predetermined threshold value, such as a small curb at an side end of a road, a small road sign or signboard by a roadside, or the like. These structures having small sizes may be previously identified on map information.

As described above, only when determining that a structure can be distinguished from an image, the change point detection unit 164 can determine that a change point is occurred between the image of the in-vehicle camera 110 and map information. Consequently, erroneous detection of a change point is constrained when a coincidence degree becomes low because a structure represented in an image is not different from a corresponding structure represented in map information, and the structure may not be distinguished from the image.

Information relating to a change point may be managed on the server 300 as information about a blacklist indicating that there is a trouble in automated driving. The information about the blacklist may be transmitted to each of the vehicles 100 via the communication network 400 and the wireless base station 500. Consequently, for example, the vehicle 100 receiving the information about the blacklist can call driver's attention to a fact that an actual structure has changed relative to map information, by issuing an alert to a driver of the vehicle 100 before reaching a vicinity of a position where a change point is detected. Particularly when the server 300 needs a certain period of time until updated map information is distributed to each of the vehicles 100, each of the vehicles 100 recognizes the information about the blacklist before each of the vehicles 100 receives the updated map information, and thereby, each of the vehicles 100 can call driver's attention to a fact that an actual structure has changed relative to map information, even before the map information is updated. It is also possible that the information about the blacklist is utilized in the server 300 or the vehicle 100, for setting of a prohibited section of automated driving, lane change planning that avoids the prohibited section of automated driving, and a route search that avoids the prohibited section of automated driving.

The processor 160 may not always perform processing for detecting a change point. For example, the processor 160 may detect a change point exclusively when a failure highly associated with a change of a structure occurs in automated driving control. As such a failure, for example, the following case or the like can be cited; the vehicle 100 goes out of a desired route due to a fact that an actual division line has changed relative to a division line represented in map information. Consequently, loads of processing of detecting a change point and processing of updating map information are suppressed, and a load of processing of communicating with the server 300 involved in detection of a change point is constrained.

Since the blacklist indicates that a map is being modified, the processor 160 may reduce a processing load by performing processing for detecting a change point at a point other than a point included in the information about the blacklist, on the basis of the above-described information about the blacklist.

Although it has been described above that the change point detection processing is performed on the vehicle 100, the processor 312 of the control device 310 of the server 300 may execute the processing of each unit illustrated in FIG. 4. In this case, an image generated by the in-vehicle camera 110, information relating to a current position and posture of the vehicle 100, an internal parameter, and environment information are transmitted to the wireless base station 500 from the wireless terminal 140, and acquired by the server 300. The processor 312 of the server 300 performs processing similar to the above-described change point detection processing by the processor 160, and detects a change point. Further, the processor 312 of the server 300 performs processing similar to that of the above-described map information update unit 165, and updates map information.

Processing up to the change point detection processing may be performed on the vehicle 100, and update of map information may be performed on the server 300. In this case, a coordinate of a change point detected on the vehicle 100, and information relating to a kind of structure are transmitted to the wireless base station 500 from the wireless terminal 140, and acquired by the server 300. The processor 312 of the server 300 performs processing similar to that of the above-described map information update unit 165, and updates map information.

Furthermore, according to another modification, a change point detection device may be implemented separately from the ECU 150, as a device such as a drive recorder or a navigation device included in the vehicle 100.

While the preferred embodiments according to the present invention have been described above, the present invention is not limited to these embodiments, and various modifications and changes can be made within the description in claims.

The invention claimed is:

1. A change point detection device comprising:
    a memory that stores map information representing a plurality of structures associated with a traveling condition on and around a road; and
    a processor configured to:
    detect, from an image that represents an environment around a vehicle acquired by a camera mounted on the vehicle, an object hiding, in the image, a hidden structure of the plurality of structures represented in the map information;
    collate a structure of the plurality of structures represented in the map information, other than the hidden structure, with an actual structure represented in the image, to thereby calculate a coincidence degree between the image and the map information without consideration of the hidden structure; and
    determine, when the coincidence degree is less than or equal to a predetermined threshold value, that an actual structure represented in the image differs from a corresponding structure of the plurality of structures represented in the map information,
    whereby automated driving control of the vehicle is enhanced based on the difference in the actual structure.

2. The change point detection device according to claim 1, wherein the processor determines whether the actual structure is distinguishable from the image, based on information representing a condition of the environment around the vehicle when the image is acquired, a size of a region where the object is represented on the image, or a size of the actual structure, and determines that the actual structure differs from the corresponding structure only when determining that the actual structure is distinguishable from the image.

3. The change point detection device according to claim 1, wherein,
    with regard to each partial image of a plurality of partial images acquired by separating the image, the processor collates the partial image with a partial region corresponding to the partial image in the map information, and calculates a partial coincidence degree between the partial image and the partial region of the map information, and
    when the coincidence degree is more than the predetermined threshold value, and the partial coincidence degree regarding any of the plurality of partial images is less than or equal to a predetermined partial coincidence degree threshold value, the processor determines that the actual structure represented in the partial image is different from the corresponding structure represented in the partial region corresponding to the partial image in the map information.

4. The change point detection device according to claim 1, wherein the processor is further configured to update the map information, based on the difference in the actual structure.

5. A map information distribution system comprising a plurality of vehicles, and a server communicable with each vehicle of the plurality of vehicles,
    wherein each vehicle of the plurality of vehicles includes a change point detection device, the change point detection device including:
    a memory that stores map information representing a plurality of structures associated with a traveling condition on and around a road; and
    a processor configured to:
    detect, from an image that represents an environment around a vehicle acquired by a camera mounted on the vehicle, an object hiding, in the image, a hidden structure of the plurality of structures represented in the map information,
    collate a structure of the plurality of structures represented in the map information, other than the hidden structure, with an actual structure represented in the image, to thereby calculate a coincidence degree between the image and the map information without consideration of the hidden structure,
    determine, when the coincidence degree is less than or equal to a predetermined threshold value, that an actual structure represented in the image differs from a corresponding structure of the plurality of structures represented in the map information, and
    transmit information about the determined difference in the actual structure to the server,
    wherein the server is configured to receive the information about the difference in the actual structure from any vehicle of the plurality of vehicles, and to transmit the information about the difference in the actual structure to another vehicle of the plurality of vehicles,
    whereby automated driving control of the other vehicle is enhanced based on the transmitted information.

* * * * *